US011354594B2

(12) United States Patent
Chen et al.

(10) Patent No.: US 11,354,594 B2
(45) Date of Patent: Jun. 7, 2022

(54) BLACK-BOX OPTIMIZATION USING NEURAL NETWORKS

(71) Applicant: DeepMind Technologies Limited, London (GB)

(72) Inventors: Yutian Chen, Cambridge (GB); Joao Ferdinando Gomes de Freitas, London (GB)

(73) Assignee: DeepMind Technologies Limited, London (GB)

( * ) Notice: Subject to any disclaimer, the term of this patent is extended or adjusted under 35 U.S.C. 154(b) by 1 day.

(21) Appl. No.: 16/601,505

(22) Filed: Oct. 14, 2019

(65) Prior Publication Data

US 2020/0042901 A1 Feb. 6, 2020

Related U.S. Application Data

(63) Continuation of application No. PCT/EP2018/059354, filed on Apr. 12, 2018.

(60) Provisional application No. 62/484,821, filed on Apr. 12, 2017.

(51) Int. Cl.
*G06N 20/00* (2019.01)
*G06N 3/04* (2006.01)
*G06N 3/08* (2006.01)
*G06F 17/18* (2006.01)

(52) U.S. Cl.
CPC ............. *G06N 20/00* (2019.01); *G06F 17/18* (2013.01); *G06N 3/04* (2013.01); *G06N 3/08* (2013.01)

(58) Field of Classification Search
CPC .......... G06F 17/18; G06N 20/00; G06N 3/04; G06N 3/08
See application file for complete search history.

(56) References Cited

U.S. PATENT DOCUMENTS

| 10,534,994 | B1* | 1/2020 | Kaul | G06N 3/084 |
| 10,565,498 | B1* | 2/2020 | Zhiyanov | G06N 7/005 |
| 2006/0193342 | A1* | 8/2006 | Sarsfield | G06F 40/205 |
| | | | | 370/466 |
| 2015/0324690 | A1* | 11/2015 | Chilimbi | G06N 3/08 |
| | | | | 706/25 |

(Continued)

OTHER PUBLICATIONS

Graves et al., "A Comparison Between Spiking and Differentiable Recurrent Neural Networks on Spoken Digit Recognition", 2004 (Year: 2004).*

(Continued)

*Primary Examiner* — Omar F Fernandez Rivas
*Assistant Examiner* — Selene A. Haedi
(74) *Attorney, Agent, or Firm* — Fish & Richardson P.C.

(57) ABSTRACT

Methods and systems for determining an optimized setting for one or more process parameters of a machine learning training process are described. One of the methods includes processing a current network input using a recurrent neural network in accordance with first values of the network parameters to obtain a current network output, obtaining a measure of the performance of the machine learning training process with an updated setting defined by the current network output, and generating a new network input that includes (i) the updated setting defined by the current network output and (ii) the measure of the performance of the training process with the updated setting defined by the current network output.

19 Claims, 2 Drawing Sheets

(56) References Cited

U.S. PATENT DOCUMENTS

| | | | |
|---|---|---|---|
| 2016/0224903 A1* | 8/2016 | Talathi | G06N 7/005 |
| 2016/0328644 A1* | 11/2016 | Lin | G06N 3/08 |
| 2017/0024642 A1* | 1/2017 | Xiong | G06N 3/08 |
| 2018/0240010 A1* | 8/2018 | Faivishevsky | G06N 3/0445 |

OTHER PUBLICATIONS

Bengio, "Practical Recommendations for Gradient-Based Training of Deep Architectures", Sep. 16, 2012 (Year: 2012).*

Andrychowicz et al.,"Learning to Learn by Gradient Descent by Gradient Descent", Advances in Neural Information Processing Systems 29, 2016, 9 pages.

Bengio et al., "On the Optimization of a Synaptic Learning Rule", Preprints Conf. Optimally in Artificial and Biological Neural Networks, University of Texas, 1992, 29 pages.

Bergstra et al., "Algorithms for Hyper-Parameter Optimization", Advances in Neural Information Processing Systems 24, 2011, 9 pages.

Brochu et al., "A Tutorial on Bayesian Optimization of Expensive Cost Functions, with Application to Active User Modeling and Hierarchical Reinforcement Learning", arXiv: 1012.2599v1, Dec. 12, 2010, 49 pages.

Bubeck et al., "Pure Exploration in Multi-armed Bandits Problems", International Conference on Algorithmic Learning Theory, 2009, 15 pages.

Chen et al., "Learning to learn for global optimization of black box functions," Ai Ch E Journal, Dec. 9, 2016, 12 pages.

Desautels et al., "Parallelizing Exploration-Exploitation Tradeoffs in Gaussian Process Bandit Optimization", Journal of Machine Learning Research 15, 2014, pp. 4053-4103.

Duan et al., "RL2: Fast Reinforcement Learning via Slow Reinforcement Learning", arXiv: 1611.02779v2, Nov. 10, 2016, 14 pages.

Eggensperger et al., "Towards an Empirical Foundation for Assessing Bayesian Optimization of Hyperparameters", NIPS Workshop on Bayesian Optimization in Theory and Practice, 2013, 10:1-5.

Gabillion et al., "Best Arm Identification: A Unified Approach to Fixed Budget and Fixed Confidence", Advances in Neural Information Processing Systems 25, 2012, 9 pages.

Graves et al., "Hybrid Computing Using a Neural Network with Dynamic External Memory", Nature, 2016, 538:471-492.

Harlow et al., "The Formation of Learning Sets", Psychological Review, 1949, 15 pages.

Hochreiter et al., "Learning to Learn Using Gradient Descent", International Conference on Artificial Neural Networks, 2001, 8 pages.

Hochreiter et al., "Long Short-Term Memory", Neural Computation, 1997, 9(8):1735-1780.

Hoffman et al., "New Inference Strategies for Solving Markov Decision Processes using Reversible Jump MCMC", Proceedings of the 25th Conference on Uncertainty in Artificial Intelligence, 2009, pp. 223-231.

Hutter et al., "Sequential Model-Based Optimization for General Algorithm Configuration", International Conference on Learning and Intelligent Optimization, 2011, 17 pages.

Kehoe, "A layered network model of associative learning: learning to learn and configuration", Psychological Review, 1988, 23 pages.

Kohavi et al., "Controlled experiments on the web: survey and practical guide", Data Mining and Knowledge Discoveiy, Feb. 2009, 18(1):140-181.

Li et al., "Learning to Optimize", aeXiv: 1606.01885v1, Jun. 6, 2016, 9 pages.

Naik et al., "Meta-Neural Networks that Learn by Learning", IJCNN International Joint Conference on Neural Networks, 1992, pp: I-437-I442.

PCT International Preliminary Report on Patentability in International Appln. No. PCT/EP2018/059354, dated Oct. 15, 2019, 13 pages.

PCT International Search Report and Written Opinion in International Appln. No. PCT/EP2018/059354, dated Jul. 18, 2019, 19 pages.

Rasmussen et al., "Gaussian Processes for Machine Learning", Institute for Adaptive and Neural Computation, Aug. 2007, 66 pages.

Ravi et al., "Optimization as a Model for Few-Shot Learning", International Conference on Learning Representation, 2017.

Santoro et al., "Meta-learning with memory-augmented neural networks", Proceedings of Machine Learning Research, 48:1842-1850.

Schmidhuber, "Evolutionary Principles in Self-Referential Learning" Learning How to Learn: The Meta-Meta-Meta, PhD Thesis, 1987.

Scott et al., "A modem Bayesian look at the multi-armed bandit", Applied Stochastic Models in Business and Industry, 2010, 26(6):639-658.

Shahriar et al., "Taking the Human Out of the Loop: A Review of Bayesian Optimization", Proceedings of the IEEE, 2016, 104(1): 148-175.

Snoek et al., "Input Warping for Bayesian Optimization of Non-Stationary Functions", International Conference of Machine Learning, 2014, 9 pages.

Snoek et al., "Practical Bayesian Optimization of Machine Learning Algorithms", Advances in Neural Information Processing Systems 25, 2012, 9 pages.

Spelke et al., "Core Knowledge", Developmental Science, 2007, 10(1):89-96.

Srinivas et al., "Gaussian Process Optimization in the Bandit Setting: No Regret and Experimental Design", arXiv:0912.3995v4, Jun. 9, 2010, 17 pages.

Wang et al., "Bayesian multiscale optimistic optimization", International Conference on Artificial Intelligence and Statistics, 2014, 33:1005-1014.

Wang et al., "Learning to Reinforcement Learn", arXiv: 1611.05763v3, Jan. 23, 2017, 17 pages.

Ward, "Reminiscence and rote learning", Psychological Monographs, 1937, 49(4):i-64.

Williams, "Simple statistical gradient-following algorithms for connectionist reinforcement learning", Machine Learning, May 1992, 8(3-4):229-256.

Zoph et al., "Neural Architecture Search with Reinforcement Learning," arXiv, Feb. 15, 2017, 16 pages.

Zoph et al., "Neural Optimizer Search with Reinforcement Learning", Proceedings of the 34th International Conference on Machine Learning, Aug. 2017, 70:10 pages.

EP Office Action in European Appln. No. 18717596.3, dated Apr. 22, 2021, 10 pages.

* cited by examiner

BLACK-BOX OPTIMIZATION USING NEURAL NETWORKS

CROSS-REFERENCE TO RELATED APPLICATIONS

This application is a continuation of and claims priority to PCT Application No. PCT/EP2018/059354, filed on Apr. 12, 2018, which claims priority to U.S. Provisional Application No. 62/484,821, filed on Apr. 12, 2017. The disclosures of the prior applications are considered part of and are incorporated by reference in the disclosure of this application.

BACKGROUND

This specification relates to determining optimized settings for process parameters of a machine learning training process using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a process parameter optimization system can determine optimized values for one or more process parameters of a machine learning training process, e.g., values for one or more hyper-parameters of the machine learning training process.

In one innovative aspect of the present disclosure, a system for determining an optimized setting for one or more process parameters of a machine learning training process includes one or more computers and one or more storage devices storing instructions that when executed by the one or more computers cause the one or more computers to implement: a recurrent neural network and a subsystem.

The recurrent neural network has a plurality of network parameters and is configured to: receive a sequence of network inputs, each network input in the sequence comprising (i) a respective input setting for the one or more process parameters and (ii) a measure of a performance of the training process with the input setting, and process the sequence of network inputs in accordance with the network parameters to generate a respective network output for each network input that defines an updated setting for the one or more process parameters.

The subsystem is configured to: determine, for each of a plurality of candidate settings for the one or more process parameters, a respective measure of the performance of the machine learning training process with the candidate setting, wherein the determining comprises repeatedly performing the following: processing a current network input using the recurrent neural network in accordance with first values of the network parameters to obtain a current network output, obtaining a measure of the performance of the machine learning training process with the updated setting defined by the current network output, and generating a new network input that comprises (i) the updated setting defined by the current network output and (ii) the measure of the performance of the training process with the updated setting defined by the current network output; and select a candidate setting from the plurality of candidate settings as the optimal setting for the one or more process parameters using the measures of the performance for the candidate settings.

In some implementations, the process parameters comprise one or more hyper-parameters for the training process.

In some implementations, the process parameters comprise one or more architecture settings of the machine learning model being trained using the machine learning training process.

In some implementations, the system further comprises a plurality of worker computing units, wherein each worker computing unit is configured to: receive an input setting for the one or more process parameters; execute the training process with the input setting; and measure the performance of the training process with the input setting, and wherein obtaining a measure of the performance of the training process with the updated setting defined by the current network output comprises: providing the updated setting defined by the current network output to one of the plurality of worker computing units and, obtaining, from the one of the plurality of worker computing units, the measure of the performance of the training process.

In some implementations, each worker computing unit operates asynchronously from each other worker computing unit.

In some implementations, determining, for each of a plurality of candidate settings for the one or more process parameters, a respective measure of the performance of the training process with the candidate setting further comprises: generating a plurality of initial network inputs, each initial network input comprising (i) a placeholder setting and (ii) a placeholder measure of performance; processing each of the plurality of initial network inputs using the recurrent neural network to generate a respective initial network output for each initial network input; and providing the updated settings defined by the initial network outputs to respective worker computing units in the plurality of worker computing units.

In some implementations, each network input further includes a binary variable that indicates whether or not the network input includes placeholder values, and wherein the binary variable in each initial network input indicates that the initial network input includes placeholder values.

In some implementations, the recurrent neural network is a differentiable neural computer (DNC) or is a long short-term memory (LSTM) neural network.

In some implementations, the subsystem is further configured to: determine the first values of the network parameters from initial values of the network parameters by training the recurrent neural network to, at each iteration of the training, optimize a training function.

In some implementations, the training function for each iteration is sampled from a training distribution.

In some implementations, training the recurrent neural network comprises training the recurrent neural network to minimize a summed loss function.

In some implementations, training the recurrent neural network comprises training the recurrent neural network to minimize an expected posterior improvement loss function.

In some implementations, training the recurrent neural network comprises training the recurrent neural network to minimize an observed improvement loss function.

In some implementations, the subsystem is further configured to: train the machine learning model using the machine learning training process with the optimized setting for the process parameters; and output the trained machine learning model.

The subject matter described in this specification can be implemented in particular embodiments so as to realize one or more of the following advantages.

Machine learning training processes, e.g., stochastic gradient descent-based training processes, require values of several hyper-parameters, e.g., learning rate, batch size, batch sampling strategy, and so on, to be appropriately tuned before the machine learning training process can be successfully executed to train a machine learning model. When executed with hyper-parameter values that have not been appropriately selected, the machine learning training process can fail to train the machine learning model to attain acceptable performance or can take an excessive amount of time for the model to attain acceptable performance. In other words, a low quality setting for one or more of the hyper-parameters can result in the machine learning training process not performing well.

Conventional solutions for tuning hyper-parameters can be resource intensive, i.e., can require large amounts of computational resources before appropriate values are found, can require significant manual fine-tuning or hand-engineering from users before they can applied to tune the hyper-parameters of a particular training process for a particular machine learning model, or both.

For example, random hyper-parameter search and grid hyper-parameter search both require large amounts of computational resources and often do not even consider the hyper-parameter setting that would have been optimal for training. As another example, optimization packages that use Bayesian optimization to tune hyper-parameters are resource intensive and are heavily hand-engineered.

In contrast, the techniques described in this specification for determining optimized process parameter values can quickly determine a high-quality setting for process parameters of the training process. In other words, the system determines the high-quality setting in a manner that minimizes the amount of computational resources required to discover the high-quality setting. In particular, by using a recurrent neural network as described in this specification, the described system effectively chooses candidate parameter settings to be evaluated while taking into consideration how well previously evaluated settings have performed. Additionally, once the recurrent neural network has been trained, the described techniques do not require any hand-engineering before being applied to a new hyper-parameter tuning scenario, i.e., they are fully automatic.

By parallelizing the evaluation of the performance of the training process, the described system can more quickly determine a high-quality setting for the process parameters even if the computing units performing the evaluation are operating asynchronously from one another.

The trained recurrent neural network can effectively transfer to optimizing different black box functions. That is, the system can train the recurrent neural network to optimize one function and then use the trained recurrent neural network to optimize one or more different black box functions. Thus, once trained, the described techniques are fully automatic and can be applied in multiple different hyper-parameter tuning scenarios. Additionally, the recurrent neural network can be trained using simple training functions that are differentiable and computationally-efficient to evaluate to minimize the amount of computational resources used by the training process. That is, even though the recurrent neural network will later be applied to optimize complex, non-differentiable functions, e.g., loss functions for machine learning model training, the recurrent neural network can be trained using simple training functions to ensure that training the recurrent neural network does not require an excessive amount of computational resources.

By using a recurrent neural network as described in this specification to select which candidate settings are evaluated, the system can determine an optimized setting for the process parameters that results in a high-performing machine learning training process, i.e., that results in the training of the machine learning model converging quicker and using fewer computational resources.

By parallelizing the evaluation of the candidate settings, the system can determine a higher-quality optimized setting quickly.

Because the recurrent neural network can be trained on one function and then used to optimize a different function, the recurrent neural network can be trained in a computationally efficient manner.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a process parameter optimization system implemented as one or more computer programs on one or more computers in one or more locations that determines an input that optimizes, i.e., minimizes or maximizes, a black box function.

A black box function is a function for which the closed form is not known, but that can be evaluated at a query point in the domain of the function. That is, while the closed form of the function is not known, the output generated by the function for a given input can be evaluated.

In particular, the black box function is a function that measures the performance of a training process for a machine learning model, i.e., a process that trains a machine learning model to determine trained values of the parameters of the machine learning model, e.g., stochastic gradient descent or another gradient-descent based training process. More specifically, the training process is a process that trains the machine learning model to determine values for the weights of the machine learning model that optimize a training objective function, e.g., a loss function, that depends on the outputs generated by the model.

The machine learning model can be any of a variety of machine learning models, e.g., a deep neural network, a generalized linear model, or a support vector machine, configured to perform any of a variety of machine learning tasks, e.g., image processing tasks, speech recognition tasks, sequence transduction tasks, machine translation tasks, and so on.

The training objective function is generally a function that measures an error between the outputs generated by the model and outputs that should have been generated by the model. In this example, the black box function can be the training objective function, e.g., the loss function, as evaluated on a set of test inputs after the machine learning model has been trained using the training objective function for some number of iterations or for some period of time.

In these examples, the system optimizes the black box function with respect to one or more process parameters of the training process, i.e., determines the setting for the process parameters that minimizes or maximizes the measure of performance of the training process.

The process parameters can include one or more hyper-parameters of the training process. A hyper-parameter is a value that affects the performance of the training process but that is not learned as part of the training process. Examples of hyper-parameters can include, e.g., learning rate, momentum rate, batch size, and so on. More generally, instead of or in addition to the hyper-parameters, the process parameters can include architecture settings for the machine learning model, e.g., number of hidden layers, types of hidden layers, number of nodes per hidden layer, number of convolutional layers, number and properties of filters of the convolutional layers, and so on.

Figure 1:
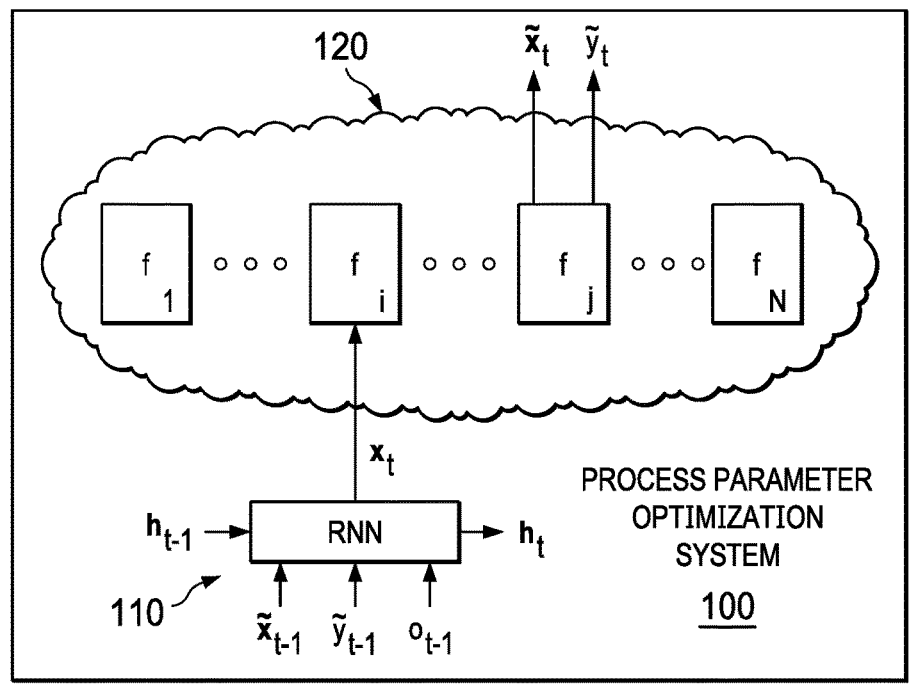
FIG. 1 shows an example process parameter optimization system.

FIG. 1 shows an example process parameter optimization system 100. The process parameter optimization system 100 is an example of a system implemented as computer programs on one or more computers in one or more locations, in which the systems, components, and techniques described below can be implemented.

As described above, the process parameter optimization system 100 is a system that determines optimized values for one or more process parameters of a machine learning training process.

Because the optimized values for the process parameters will generally be different for different machine learning models, even if the two machine learning models are trained on the same training data and using a machine learning training process that is otherwise the same, the process parameter optimization system 100 generates respective optimized process parameter values for each machine learning model that is to be trained using the machine learning training process.

Once the process parameter optimization system 100 has determined the optimized values for training a given machine learning model, the process parameter optimization system 100 can train the machine learning model using the machine learning training process and in accordance with the optimized values of the process parameters. Once trained, the process parameter optimization system 100 can then output the trained machine learning model, i.e., output data specifying the trained values of the weights of the machine learning model to a user device or to another system, use the trained machine learning model to perform inference in accordance with the trained values of the weights of the model, or both.

Alternatively or in addition to training the machine learning model, the process parameter optimization system 100 can provide the optimized values of the process parameters to another system for use in training the machine learning model using the machine learning training process.

To determine the optimized process parameter values for a given machine learning model, the process parameter optimization system 100 uses a recurrent neural network 110 having a plurality of network parameters.

The recurrent neural network 110 is configured to receive a sequence of network inputs and process the sequence of network inputs in accordance with the network parameters to generate a respective network output for each network input. The recurrent neural network 100 can be implemented as any appropriate type of recurrent neural network that maintains an internal state or other data between network inputs in the sequence and uses and updates the internal state or other data when processing a given network input in the sequence. For example, the recurrent neural network 110 can be a long short-term memory (LSTM) neural network or a neural network that is augmented with an external memory, e.g., a differentiable neural computer (DNC).

In particular, the network input at a given time step t in the sequence includes at least (i) a respective input setting $\tilde{x}_{t-1}$ for each of the one or more process parameters that are being optimized and (ii) a measure $\tilde{y}_{t-1}$ of a performance of the training process with the input setting $\tilde{x}_{t-1}$ according to the measure that is being optimized by the system 100.

The network output generated by the recurrent neural network 110 for the network input at the given time step t defines an updated setting $x_t$ for the one or more process parameters, i.e., a setting that is predicted to, in the case where the measure of performance is being minimized, increase, or, in the case where the measure is being maximized, decrease, the measure of performance of the process relative to the measure in the network input. As described above, the recurrent neural network 110 uses an internal state $h_{t-1}$ when generating the network output at time step t and also updates the internal state $h_{t-1}$ to generate an updated internal state $h_t$. For example, the network output can be a probability distribution over possible combinations of settings for the one or more process parameters. As another example, the network can directly predict the updated settings.

In order for the network outputs generated by the recurrent neural network 110 to predict effective process parameter settings, i.e., to predict settings that are helpful in determining high-quality optimized process parameter settings, the system 100 trains the recurrent neural network on training data. Training the recurrent neural network 110 is described in more detail below with reference to FIG. 2.

The system 100 determines the optimized settings for the process parameters by determining measures of performance for various candidate settings for the process parameters. After termination criteria are satisfied, e.g., after measures for a predetermined number of candidate settings have been determined or after a predetermined amount of time has elapsed since beginning to determine measures for candidate settings, the system 100 can select the candidate settings that have the best measure of performance as the optimized settings. That is, the system 100 can select the candidate settings that have the highest measure if the measure is being maximized or the lowest measure if the measure is being minimized.

The system 100 can select the candidate settings to be evaluated by repeatedly providing inputs to the recurrent neural network 110 and using the outputs generated by the recurrent neural network 110 to select new settings for evaluation.

In particular, as part of selecting and evaluating candidate settings, the system 100 can process a current network input using the recurrent neural network in accordance with the trained values of the network parameters to obtain a current network output that defines an updated setting for the process parameters. For example, at the time step t, the system 100 can process the network input that includes at least (i) a respective input setting $\tilde{x}_{t-1}$ for each of the one or more process parameters that are being optimized and (ii) a measure $\tilde{y}_{t-1}$ of the performance of the training process with the input setting $\tilde{x}_{t-1}$ to obtain the network output that defines the updated setting $x_t$.

The system 100 then obtains a measure of the performance of the machine learning training process with the updated setting defined by the current network output and generates a new network input that includes (i) the updated setting defined by the current network output and (ii) the measure of the performance of the training process with the updated setting defined by the current network output.

In particular, to obtain the measure of performance, the system 100 executes the training process with the process parameters set to the updated setting, e.g., for a fixed number of iterations or for a fixed amount of time, and then determines the measure by computing the value of the blackbox function as a result of the training. For example, the system 100 can measure the loss on a test set after the training process has been executed.

Because the recurrent neural network 110 maintains an internal state and continues to update the internal state while processing each network input, the updated settings generated by the recurrent neural network 110 take into account the input settings that have already been evaluated and the measures for those input settings. Thus, by repeatedly providing inputs to the recurrent neural network 110 as described herein, the system 100 causes the recurrent neural network 110 to predict output settings that effectively explore the space of possible process settings and that result in optimized output settings that cause the training process to have a high performance quality.

In some implementations, the system 100 evaluates settings and generates new inputs serially, i.e., one after the other. That is, the system 100 waits until a given candidate setting has been evaluated before selecting and evaluating a new candidate setting.

In other implementations, to decrease the time required to determine the optimized settings, to improve the effectiveness of determining the optimized settings and allow more candidate settings to be evaluated, or both, the system 100 evaluates multiple candidate settings in parallel. In particular, in these implementations, the system 100 includes multiple worker computing units 120. In the example of FIG. 1, the system 100 includes N different worker computing units, where N is an integer greater than one.

Each of the worker computing units is configured to receive an input setting for the process parameters and evaluate the input setting to generate the measure of performance of the machine learning training process with the updated setting. More specifically, the worker computing unit executes the training process with the input setting and measures the performance of the training process with the input setting, e.g., by determining the loss on the test set after the training has process has been completed.

The worker computing units are configured so that they can operate independently and asynchronously from each other. In some implementations, only partial independence of operation is achieved, for example, because workers share some resources. A computing unit may be, e.g., a computer, a core within a computer having multiple cores, or other hardware or software within a computer capable of independently performing the computations to evaluate an input setting.

Because the worker computing units operate asynchronously, the network input to the recurrent neural network 110 at time step t+1 may not correspond to the updated setting generated at time step t. For example, in the example of FIG. 1, the system 100 provides the updated setting $x_t$ to the i-th worker computing unit for evaluation. Before the i-th worker computing unit has finished the evaluation, the j-th worker computing unit finishes evaluating a setting $\tilde{x}_t$ to generate a measure $\tilde{y}_t$. The system 100 can then provide a network input at time step t that includes the setting $\tilde{x}_t$ and the measure $\tilde{y}_t$ rather than waiting for i-th worker computing unit to finish evaluation the setting $x_t$. Thus, having the worker computing units 120 operate asynchronously can accelerate the determination of the optimized setting for the process parameters.

To initiate the process of selecting candidate architectures, the system 100 generates one or more initial network inputs that include placeholder initial values for the setting and corresponding measure to cause the recurrent neural network 110 to generate initial settings to be evaluated. In some implementations, to assist the recurrent neural network 110 in generating diverse queries that will be effective in initiating the search for the optimized parameters, each network input provided to the recurrent neural network 110 also includes a binary variable o that indicates whether the network input includes placeholder values. That is, the binary variable can take one value, e.g., zero, that indicates that the network input is a placeholder input and another value, e.g., one, that indicates that the network input has been generated as a result of an evaluation of a candidate setting.

Figure 2:
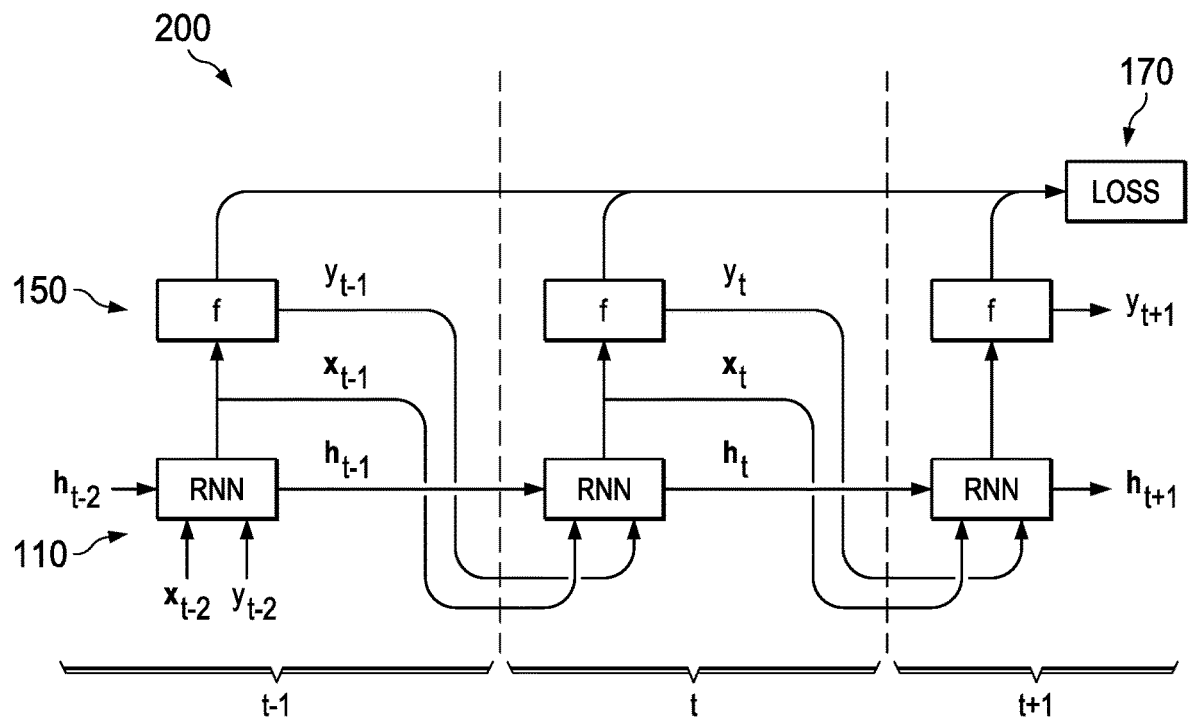
FIG. 2 shows an example training iteration during the training of the recurrent neural network.

FIG. 2 shows an example training iteration 200 during the training of the recurrent neural network 110.

During a given training iteration 200, the system 100 adjusts the current values of the network parameters of the recurrent network 110 as of the beginning of the training iteration 200.

In particular, the system 100 adjusts the current values of the network parameters to minimize a loss function 170 that depends on network outputs generated by the recurrent neural network over a number of time steps. For ease of description, the example iteration 200 includes three time steps: t−1, t, and t+1, which is the last time step in the iteration 200. However, in practice, each training iteration will generally include a large, fixed number of time steps.

More particularly, during training, the network output x generated by the recurrent neural network at each of the time steps defines a query to a training function 150 and the loss function 170 depends on values of the training function 150 for the queries.

Advantageously, the training function 150 does not need to be the same as the function that the recurrent neural network 110 is used to optimize after the recurrent neural network 110 has been trained, which will be referred to as the test time function.

In particular, the training function 150 can be a function that is differentiable and computationally efficient to evaluate. Thus, even when the test time function is a computationally intensive and non-differentiable function, i.e., a function that measures performance of a training process, the training function 150 can be a different function that allows the recurrent neural network 110 to be trained in a computationally intensive manner.

Generally, the training function 150 for a given training iteration is sampled from a prior distribution that permits efficient sampling and function differentiation. An example of such a distribution from which the training function can be sampled is a Gaussian Process.

The loss function 170 can be any appropriate loss that measures how well the query points generated by the recurrent neural network 110 during the training iteration optimize the training function 150.

For example, the loss function 170 can be a summed loss that is a sum of the values of the training function 150 for the query points generated by the recurrent neural network 110 over the time steps in the iteration.

As another example, to encourage the recurrent neural network 110 to explore, the loss function 170 can be an expected posterior improvement loss function. The expected posterior improvement loss function can be a sum of the expected posterior improvements of the query points for the time steps in the iteration. The expected posterior improvement of a query point at a given time step is the expected posterior improvement of querying the query point at the time step given the observed values of the training function at earlier time steps.

As another example of a loss that encourages the recurrent neural network 110 to explore, the loss function 170 can be an observed improvement loss function. The observed posterior improvement loss function can be a sum of the observed posterior improvements of the query points for the time steps in the iteration. The observed posterior improvement of a query point at a given time step is the minimum of (i) zero and (ii) the difference between the value of the training function for the query point and the smallest observed value of the training function at any earlier time step.

As shown in FIG. 2, to train the neural network 110 on the loss function 170, at each time step the system 100 provides an input to the recurrent neural network 110 that includes the query point from the preceding time step and the observed value of the training function 150 for that query point.

Once the observed value for the last time step for the iteration has been determined, the system 100 updates the values of the network parameters by determining the gradient of the loss function 170 with respect to the network parameters and performing stochastic gradient descent (SGD).

Because the training function 150 has been selected to be computationally efficient and differentiable, evaluating the training function 150 at the query points and backpropagating through the training function 150 to determine the gradients are both performed in a computationally-efficient manner. Thus, the recurrent neural network 110 can be trained in a computationally-efficient manner that minimizes the amount of computational resources consumed by the training.

In implementations where the network inputs after training include the binary variable o, the network inputs during training also include the binary variable and the system generates placeholder initial inputs for the first several time steps of each training iteration.

Additionally, in implementations where after training the system 100 uses multiple worker computing units operating asynchronously to evaluate candidate settings, during training the system forces the recurrent neural network not to rely on a specific ordering of network inputs by at times processing network outputs out of order during a training iteration, i.e., by ensuring that for at least some of the time steps in the iteration, the network input at a given time step does not correspond to the network output generated at the preceding time step.

Figure 3:
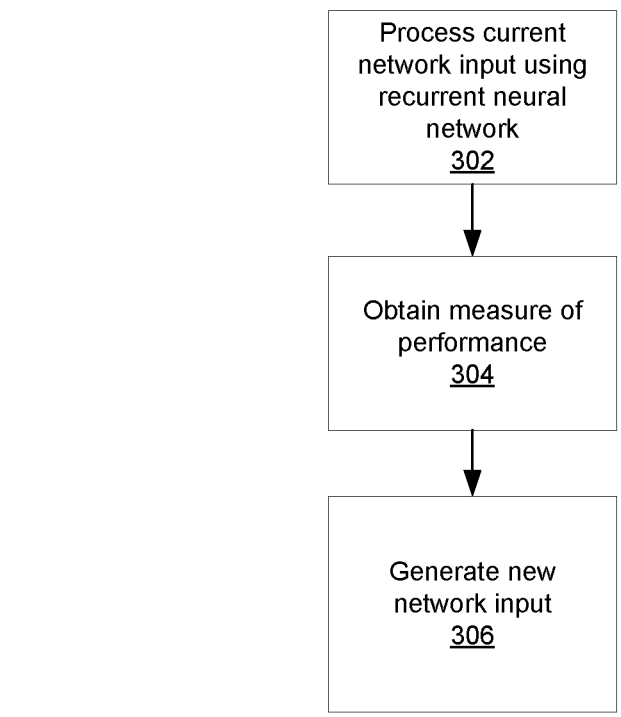
FIG. 3 is a flow diagram of an example process of determining optimized process parameter values.

FIG. 3 is a flow chart of an example process 300 for determining an optimized setting for process parameters of a machine learning training process. For convenience, the process 300 will be described as being performed by a system of one or more computers located in one or more locations. For example, a process parameter optimization system, e.g., the process parameter optimization system 100 of FIG. 1, appropriately programmed in accordance with this specification, can perform the process 300.

The system can repeatedly perform the process 300 to generate and evaluate new candidate settings for the process parameters. Once termination criteria have been satisfied, the system can select one of the candidate settings as the optimized setting for the process parameters.

The system process a current network input using the recurrent neural network and in accordance with trained values of the network parameters to obtain a current network output (step 302). As described above, if any candidate settings have already been evaluated, the network input includes the mostly-recently evaluated candidate setting and the performance measure for the candidate setting. If no candidate settings have been evaluated, the current network input is a dummy initial input that includes placeholder values and encourages the recurrent neural network to effectively predict initial candidate settings. That is, if the system evaluates N settings in parallel, for the first N iterations of the process 300, the current network input is an initial input that includes placeholder values for the setting and for the performance measure. In some cases, the initial inputs also each include a binary variable set to a value that indicates that the initial input includes placeholder values.

The system obtains a measure of performance of the model training process with the updated setting defined by the current network output (step 304). In some cases, the system directly executes the training process to determine the measure of performance. In other cases, the system sends the updated setting to a worker computing unit from a set of multiple worker computing units that are each configured to execute the training process with received input settings to generate the measure of performance for the input settings.

The system generates a new network input (step 306), i.e., to be used in the next iteration of the process 300. The new network input includes the updated setting and the measure of performance for the updated setting. As described above, in some cases, the new network input also includes a binary variable set to a value that indicates that the new network input does not include placeholder values.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TENSORFLOW® framework, a MICROSOFT® COGNITIVE TOOLKIT framework, an APACHE® SINGA framework, or an APACHE® MXNET framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for determining an optimized setting for one or more hyper-parameters of a machine learning training process of training a machine learning model, the system comprising one or more computers and one or more storage devices storing instructions that when executed by the one or more computers cause the one or more computers to implement:
   a first recurrent neural network that corresponds to a plurality of worker computing units, the first recurrent neural network having a plurality of network parameters and being configured to:
      receive a sequence of network inputs, each network input in the sequence comprising (i) a respective input setting that specifies the one or more hyper-parameters and (ii) a measure of a performance of the machine learning training process with the input setting,
      process the sequence of network inputs in accordance with the network parameters to generate a respective network output for each network input that defines an updated setting for the one or more hyper-parameters, and
      provide the updated setting to one of the plurality of worker computing units to evaluate performance of the machine learning training process in training the machine learning model with the updated setting;
   a subsystem configured to:
      determine, for each of a plurality of candidate settings for the one or more hyper-parameters, a respective measure of the performance of the machine learning training process with the candidate setting, wherein the determining comprises, for each time step of a plurality of time steps, performing operations comprising:
         providing, as input to the first recurrent neural network, a current network input comprising (i) a current setting of the one or more hyper-parameters of the machine learning training process and (ii) a measure of performance of the machine learning training process in training the machine learning model with the current setting;
         processing, using the first recurrent neural network in accordance with first values of the network parameters, the current network input to obtain a current network output that defines an updated setting of the one or more hyper-parameters,
         obtaining a measure of the performance of the machine learning training process in training the machine learning model with the updated setting defined by the current network output generated by the first recurrent neural network, and
         generating a new network input to be provided as input to the first recurrent neural network at the next time step, the new network input comprising (i) the updated setting defined by the current network output and (ii) the measure of the performance of the machine learning training process with the updated setting defined by the current network output; and
      select a candidate setting from the plurality of candidate settings as an optimized setting for the one or more hyper-parameters using the measures of the performance for the candidate settings; and the plurality of worker computing units, wherein each worker computing unit is configured to:
receive, from the first recurrent neural network that corresponds to the plurality of worker computing units, a respective input setting that specifies one or more hyper-parameters of the machine learning training process, wherein the one or more hyper-parameters are not learned as part of the machine learning training process;
execute the machine learning training process with the one or more hyper parameters specified by the input setting; and
measure the performance of the machine learning training process with the one or more hyper-parameters specified by the input setting,
wherein obtaining a measure of the performance of the machine learning training process with the updated setting defined by the current network output comprises:
providing the updated setting defined by the current network output generated by the first recurrent neural network to one of the plurality of worker computing units and, obtaining, from the one of the plurality of worker computing units, the measure of the performance of the machine learning training process, and
wherein the first values of the plurality of network parameters are obtained by training the first recurrent neural network to, at each iteration of the training, optimize a differentiable training function by minimizing a loss associated with the differentiable training function.

2. The system of claim 1, wherein each worker computing unit operates asynchronously from each other worker computing unit.

3. The system of claim 1, wherein determining, for each of a plurality of candidate settings for the one or more hyper-parameters, a respective measure of the performance of the machine learning training process with the candidate setting further comprises:
generating a plurality of initial network inputs, each initial network input comprising (i) a placeholder setting and (ii) a placeholder measure of performance;
processing each of the plurality of initial network inputs using the first recurrent neural network to generate a respective initial network output for each initial network input; and
providing the updated settings defined by the initial network outputs to respective worker computing units in the plurality of worker computing units.

4. The system of claim 3, wherein each network input further includes a binary variable that indicates whether or not the network input includes placeholder values, and wherein the binary variable in each initial network input indicates that the initial network input includes placeholder values.

5. The system of claim 1, wherein the first recurrent neural network is a differentiable neural computer (DNC).

6. The system of claim 1, wherein the first recurrent neural network is a long short-term memory (LSTM) neural network.

7. The system of claim 1, wherein the differentiable training function for each iteration is sampled from a training distribution.

8. The system of claim 1, wherein the loss is a summed loss function.

9. The system of claim 1, wherein the loss is an expected posterior improvement loss function.

10. The system of claim 1, wherein the loss is an observed improvement loss function.

11. The system of claim 1, wherein the subsystem is further configured to:
train the machine learning model using the machine learning training process with the optimized setting for the hyper-parameters; and
output the trained machine learning model.

12. One or more non-transitory computer-readable storage media storing instructions that when executed by one or more computers cause the one or more computers to implement a system for determining an optimized setting for one or more hyper-parameters of a machine learning training process, the system comprising:
a first recurrent neural network that corresponds to a plurality of worker computing units, the first recurrent neural network having a plurality of network parameters and being configured to:
receive a sequence of network inputs, each network input in the sequence comprising (i) a respective input setting that specifies the one or more hyper-parameters and (ii) a measure of a performance of the machine learning training process with the input setting, and
process the sequence of network inputs in accordance with the network parameters to generate a respective network output for each network input that defines an updated setting for the one or more hyper-parameters, and
provide the updated setting to one of the plurality of worker computing units to evaluate performance of the machine learning training process in training the machine learning model with the updated setting;
a subsystem configured to:
determine, for each of a plurality of candidate settings for the one or more hyper-parameters, a respective measure of the performance of the machine learning training process with the candidate setting, wherein the determining comprises, for each time step of a plurality of time steps, performing the following:
providing, as input to the first recurrent neural network, a current network input comprising (i) a current setting of the one or more hyper-parameters of the machine learning training process and (ii) a measure of performance of the machine learning training process in training the machine learning model with the current setting;
processing, using the first recurrent neural network in accordance with first values of the network parameters, the current network input to obtain a current network output that defines an updated setting of the one or more hyper-parameters,
obtaining a measure of the performance of the machine learning training process in training the machine learning model with the updated setting defined by the current network output generated by the first recurrent neural network, and
generating a new network input to be provided as input to the first recurrent neural network at the next time step, the new network input comprising (i) the updated setting defined by the current network output and (ii) the measure of the performance of the machine learning training process with the updated setting defined by the current network output; and
select a candidate setting from the plurality of candidate settings as an optimized setting for the one or more hyper-parameters using the measures of the performance for the candidate settings; and the plurality of worker computing units, wherein each worker computing unit is configured to:

receive, from the first recurrent neural network that corresponds to the plurality of worker computing units, a respective input setting that specifies one or more hyper-parameters of the machine learning training process, wherein the one or more hyper-parameters are not learned as part of the machine learning training process;

execute the machine learning training process with the one or more hyper parameters specified by the input setting; and measure the performance of the machine learning training process with the one or more hyper-parameters specified by the input setting, wherein obtaining a measure of the performance of the machine learning training process with the updated setting defined by the current network output comprises:

providing the updated setting defined by the current network output generated by the first recurrent neural network to one of the plurality of worker computing units and, obtaining, from the one of the plurality of worker computing units, the measure of the performance of the machine learning training process, and wherein the first values of the plurality of network parameters are obtained by training the first recurrent neural network to, at each iteration of the training, optimize a differentiable training function by minimizing a loss associated with the differentiable training function.

13. A method of determining an optimized setting for one or more process parameters of a machine learning training process, the method comprising:

determining, for each of a plurality of candidate settings for the one or more hyper-parameters, a respective measure of the performance of the machine learning training process with the candidate setting, wherein the determining comprises, for each time step of a plurality of time steps, performing the following:

providing, as input to a first recurrent neural network that corresponds to a plurality of worker computing units, a current network input comprising (i) a current setting of the one or more hyper-parameters of the machine learning training process and (ii) a measure of performance of the machine learning training process in training the machine learning model with the current setting;

processing, using the first recurrent neural network in accordance with first values of the network parameters, the current network input to obtain a current network output that defines an updated setting of the one or more hyper-parameters, and provide the updated setting to one of the plurality of worker computing units to evaluate performance of the machine learning training process in training the machine learning model with the updated setting, obtaining a measure of the performance of the machine learning training process in training the machine learning model with an updated setting defined by the current network output generated by the first recurrent neural network, comprising providing the updated setting defined by the current network output generated by the first recurrent neural network to one of a plurality of worker computing units and, obtaining, from the one of the plurality of worker computing units, the measure of the performance of the machine learning training process, wherein each worker computing unit is configured to:

receive, from the first recurrent neural network that corresponds to the plurality of worker computing units, a respective input setting that specifies one or more hyper-parameters of the machine learning training process, wherein the one or more hyper-parameters are not learned as part of the machine learning training process;

execute the machine learning training process with the one or more hyper parameters specified by the input setting; and measure the performance of the machine learning training process with the one or more hyper-parameters specified by the input setting, generating a new network input to be provided as input to the first recurrent neural network at the next time step, the new network input comprising (i) the updated setting defined by the current network output and (ii) the measure of the performance of the machine learning training process with the updated setting defined by the current network output; and selecting a candidate setting from the plurality of candidate settings as an optimized setting for the one or more process parameters using the measures of the performance for the candidate settings, and wherein the first values of the plurality of network parameters are obtained by training the first recurrent neural network to, at each iteration of the training, optimize a differentiable training function by minimizing a loss associated with the differentiable training function.

14. The method of claim 13, wherein determining, for each of a plurality of candidate settings for the one or more hyper-parameters, a respective measure of the performance of the machine learning training process with the candidate setting further comprises:

generating a plurality of initial network inputs, each initial network input comprising (i) a placeholder setting and (ii) a placeholder measure of performance;

processing each of the plurality of initial network inputs using the first recurrent neural network to generate a respective initial network output for each initial network input; and providing the updated settings defined by the initial network outputs to respective worker computing units in the plurality of worker computing units.

15. The method of claim 14, wherein each network input further includes a binary variable that indicates whether or not the network input includes placeholder values, and wherein the binary variable in each initial network input indicates that the initial network input includes placeholder values.

16. The method of claim 13, wherein the loss is a summed loss function.

17. The method of claim 13, wherein the loss is an expected posterior improvement loss function.

18. The method of claim 13, wherein the loss is an observed improvement loss function.

19. The method of claim 13, further comprising:

training the machine learning model using the machine learning training process with the optimized setting for the hyper-parameters; and outputting the trained machine learning model.

* * * * *